United States Patent [19]

Jack et al.

[11] Patent Number: 4,850,763
[45] Date of Patent: Jul. 25, 1989

[54] TOOL TRACK FOR USE ON AIRCRAFT

[75] Inventors: Milton R. Jack, Riyadh, Saudi Arabia; Quentin T. Woods, Woodinville, Wash.

[73] Assignee: The Boeing Company, Seattle, Wash.

[21] Appl. No.: 252,889

[22] Filed: Oct. 3, 1988

[51] Int. Cl.⁴ .................. B23C 1/20; B23B 45/14
[52] U.S. Cl. .................. 409/178; 408/88; 408/91; 409/175
[58] Field of Search .......... 408/67, 68, 69, 70, 408/72 R, 90, 91, 94, 97, 98, 78, 99, 100, 103, 109, 110, 114, 42, 43; 409/241, 235, 178, 175, 180; 29/26 R, 26 A; 51/241 S, 241 LG; 144/249 R

[56] References Cited

U.S. PATENT DOCUMENTS

| | | | |
|---|---|---|---|
| 2,814,219 | 11/1957 | Zern | 77/62 |
| 3,109,466 | 11/1963 | Jones | 408/103 |
| 3,327,573 | 6/1967 | Prussiano | 408/115 |
| 3,500,884 | 3/1970 | Hand et al. | 144/3 |
| 3,685,915 | 8/1972 | Vierstraete | 29/26 R |
| 3,706,505 | 12/1972 | Stougaard | 409/78 |
| 3,945,749 | 3/1976 | McIlrath | 51/241 LG |
| 4,060,333 | 11/1977 | White | 408/241 |
| 4,061,437 | 12/1977 | Strange et al. | 408/241 |
| 4,108,566 | 8/1978 | Jones | 408/115 |
| 4,268,196 | 5/1981 | Harron | 409/180 X |
| 4,306,823 | 12/1981 | Nashlund | 408/109 |
| 4,445,277 | 5/1984 | Keefe | 408/115 |
| 4,486,128 | 12/1984 | Baker et al. | 408/88 |
| 4,533,284 | 8/1985 | Agius et al. | 408/103 |
| 4,599,018 | 7/1986 | Woods | 408/1 R |

Primary Examiner—William Briggs
Attorney, Agent, or Firm—Bruce A. Kaser

[57] ABSTRACT

A semi-automatic track drill for use in drilling fastener holes for an aircraft body includes a pair of generally spaced, parallel rails. A plurality of slider bars extend between the rails and are connected thereto in a manner so that each bar can be slid along the length of the rails. Positioned between at least two of the bars is a drill carriage which is also slidably connected to the rails. A template having a series of alternating lands and grooves registers the carriage at preselected drilling positions. The drill assembly, including the template, is secured to the aircraft body by temporary clamping bolts which are positioned in a line along the body's surface.

5 Claims, 4 Drawing Sheets

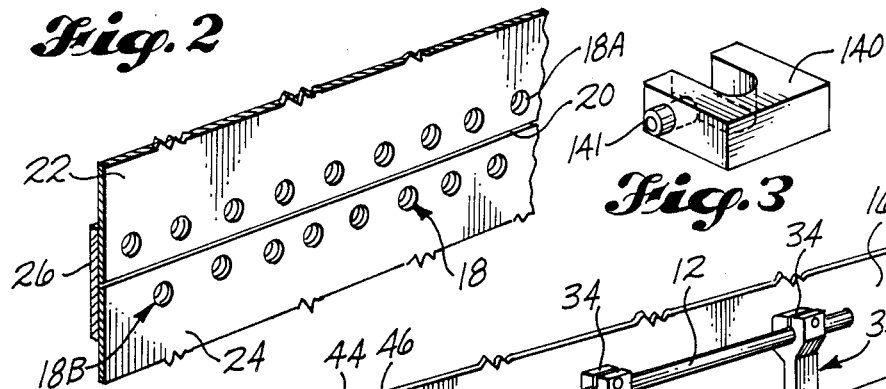
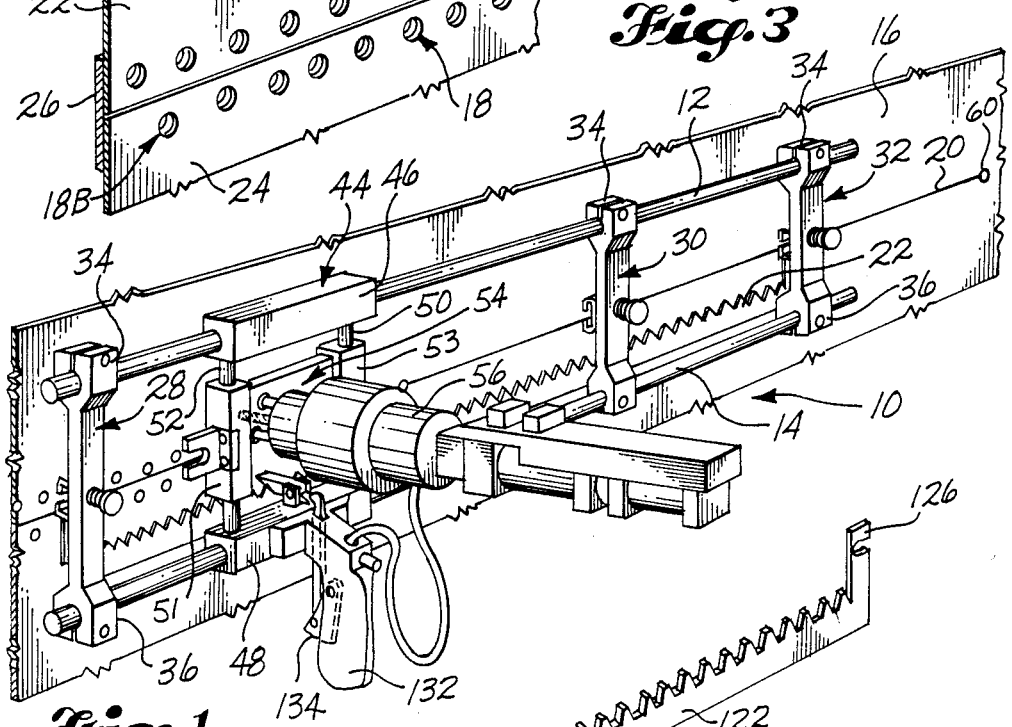
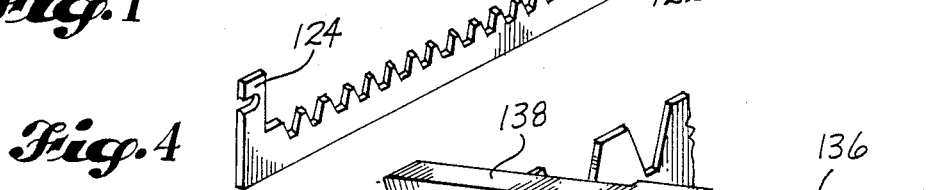
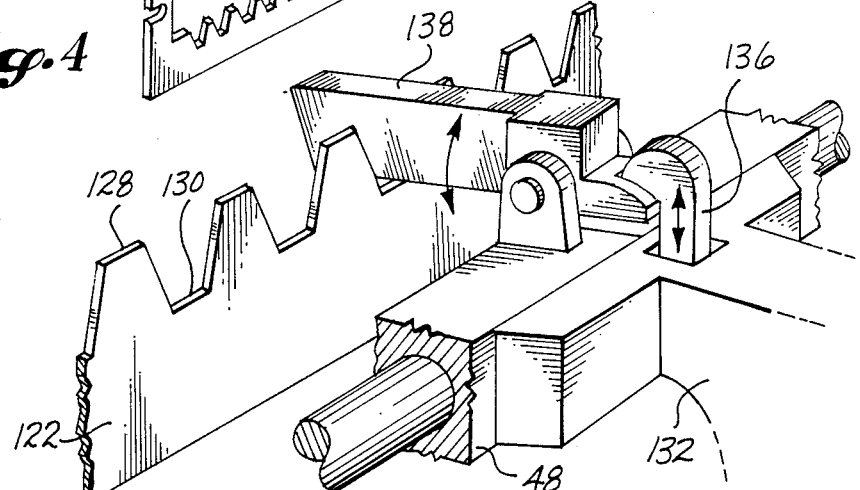

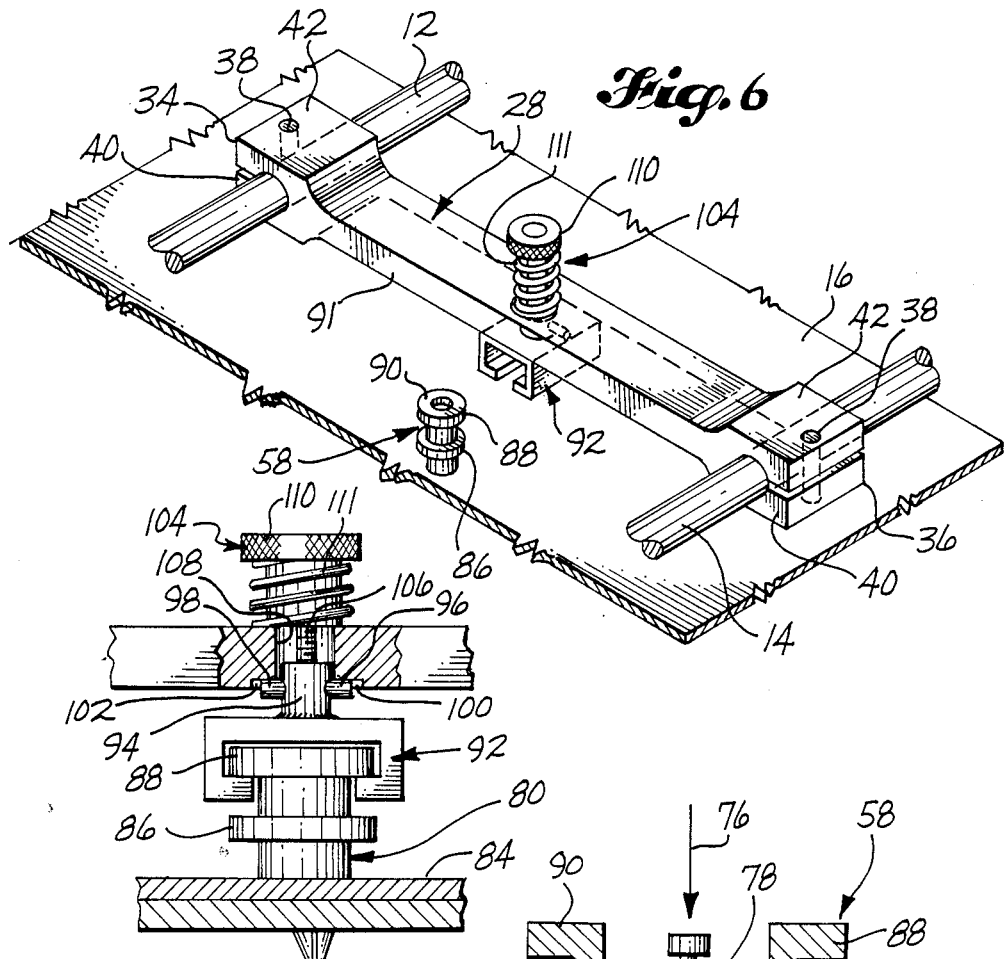
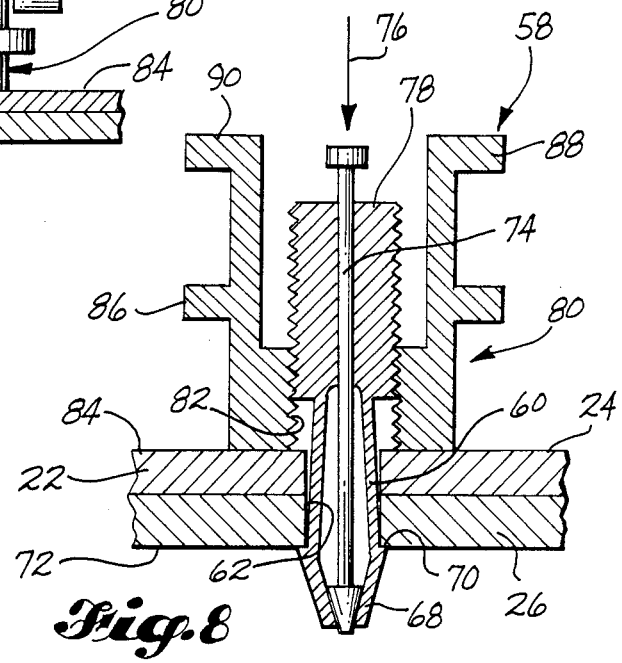

TOOL TRACK FOR USE ON AIRCRAFT

DESCRIPTION

1. Technical Field

The invention relates to drilling a multiplicity of fastener holes in aircraft bodies and the like. The fastener holes are drilled to receive fasteners which generally secure a stringer to sheet metal lap joints.

2. Background Art

The current method for drilling and countersinking fastener holes in aircraft body panels has a variety of limitations that affect both cost and quality. Typically, the holes are drilled by hand-held drills with assistance from hand-held normality guides. Drilling countersinks into the holes is also typically a manual operation. The hand-held guides result in eccentric holes being drilled at angles which are not normal to the surface of the workpiece or workpieces.

Generally, manual drilling of fastener holes is a two-step operation. The first step involves drilling a hole through the parts to be joined, for the purpose of accommodating the fastener's body. The second step involves drilling a countersink at the outer end of the hole where the fastener's head is to be seated. It is important that the head be seated so that it is substantially flush with respect to the outer surface of the parts joined together. As mentioned above, not only is maintenance of normality a problem in the typical manual drilling operation, but it is also difficult to manually drill the countersink at the correct depth, and to make it concentric with its underlying hole. These factors create undesirable stress concentrations after fastener installation and/or create undesirable aerodynamic skin drag on the body's surface.

The heads of conventional fasteners do not bear much of a load, which means high stress concentrations are created immediately below the head. This phenomenon is worsened in aircraft body skins because they are typically thinner and lighter in weight than other aircraft surfaces, the result being that a smaller area of interference is created between the skin and the fastener's body. To improve upon this situation "Briles" style rivets are used in fastening body skins, such rivets having heads which expand radially outwardly into the countersink during fastening. This creates interference between the rivet's head and the skin so that the head will be load bearing, thus alleviating some of the stress concentration on the rivet's body below the head.

Depth control, normality and concentricity of the fastener hole and countersink become particularly important when Briles rivets are used. Too deep of a countersink will result in either light or no rivet head interference with the skin. If the countersink is too shallow, the head will protrude from the skin, thus creating excessive drag and interference.

Manual drilling operations also cause scratches, nicks, and dings in the clad coating on aircraft body surfaces. These must be repaired, typically with plasma spray and subsequent hand buffing. Not only does this involve extra labor and material expenses, but leaves mottled gray repaired areas that are readily visible to an aircraft customer and sometimes necessitates compensating price reductions.

A search of the patent literature discloses a number of drilling guides or jigs which are pertinent to the present invention. For example, U.S. Pat. No. 3,327,573 to Prussiano for the "Door Lock Drilling and Mortising Device" discloses a device that drills the bores in the side and edge of a door for receiving a door lock, wherein the bores are perfectly aligned with a minimum of effort. The device is comprised of a mounting bracket A, adjustable clamps C for securing the device to a door 15, and a drill bracket B. Slots 16 in the mounting bracket A form a guide for a pair of posts 30 whose ends are received in the slots. On a post 30 there is slidably mounted for vertical movement a combined template 37 and drill support B. The posts 30 are slidably received by bores 39 in the template. Locking bolts 40, secured to the template 37, fasten the drill support bracket B securely to the post 30 when tightened, and when loosened will permit sliding movement of the drill support bracket B on the post 30 for adjustment thereof.

A more pertinent patent is U.S. Pat. No. 4,599,018 which issued to one of the co-inventors named herein, Quentin T. Woods, and which relates to an automatic traversing drilling unit. The unit disclosed in this patent incrementally moves along a pair of spaced apart support members for drilling a row of holes. The support members are secured to "latch" bolts positioned along the surface which is to be drilled. A drilling carriage moves along the support members in both the X and Y directions to automatically drill the holes.

The following patents also disclose other types of jigs and drill mounts: U.S. Pat. No. 2,814,219, granted Nov. 26, 1957 to W. B. Zern; U.S. Pat. No. 3,109,466, granted Nov. 5, 1963 to B. E. Jones; U.S. Pat. No. 3,327,573 granted June 27, 1967 to F. H. Prussiano; U.S. Pat. No. 3,500,884, granted Mar. 17, 1970 to A. E. Hand et al; U.S. Pat. No. 4,060,333, granted Nov. 29, 1977 to John T. White; U.S. Pat. No. 4,061,437, granted Dec. 6, 1977 to Delbert D. Strange et al; U.S. Pat. No. 4,108,566, granted Aug. 22, 1978 to Everett E. Jones; U.S. Pat. No. 4,306,823, granted Dec. 22, 1981 to John E. Nashlund; U.S. Pat. No. 4,445,277, granted May 1, 1984 to John Keefe; and U.S. Pat. No. 4,533,284, granted Aug. 6, 1985 to Frank P. Agius et al.

Automatic or semi-automatic track drills such as the track drill disclosed in U.S. Pat. No. 4,599,018 may eventually be available for use on aircraft wings. However, these types of drills are too heavy for aircraft body skins because, as indicated above, the sheet metal used in the body skins is too thin and light. The purpose of the present invention is to provide a lightweight, semi-automatic track drill that is smaller and simpler, and which can be used to drill the bores for aircraft horizontal body splices. To accomplish this, the invention provides a low cost unit that makes use of simple templates instead of sophisticated microprocessor control to govern drill placement.

DISCLOSURE OF THE INVENTION

The invention is a semi-automatic track drill and method for use of the same on aircraft bodies, and the like, for drilling fastener holes in layered or overlapped parts which are temporarily secured together. The track drill comprises a pair of parallel, spaced rails having a plurality of slider bars positioned transversely relative to the rails. Opposite ends of each slider bar are slidably engaged with the rails in a manner so that they may be moved along the direction of the rails. There are gripping means associated with each bar which permit temporary fixed attachment of the bar to a clamp bolt, the latter being temporarily secured to the parts which are to be drilled. Gripping the clamp bolts holds the track drill against the workpieces. A drill carriage is also slidably engaged with the rails, but between selected slider bars, and can be moved along the rails to position a drill secured thereto for drilling holes in the parts.

There is at least one drill guide template for positioning the carriage and drill. The template has opposite ends securable to two of the temporary clamp bolts and extends therebetween. It has a plurality of drill stops in the form of alternating lands and grooves, the grooves having a "V" shape. The previously-mentioned drill carriage includes means for bringing the drill into registration with these stops, which are at preselected sequential positions, and which permits sequential, step-by-step movement of the drill along the rails for precisely drilling a row of property spaced holes.

The means on the drill carriage for registering the drill with the template includes a detent member shaped for fitment into each of the template's grooves. A handle on the carriage has a trigger and linkage releasably operable to lift this member out of a particular groove and to carry it over an adjoining land as the carriage is slid along the rails. The detent member is then lowered into the next adjoining groove by releasing the trigger at an appropriate time, which positions the drill at the next drilling location.

Each clamp bolt is an assembly adapted to include a cylindrical sleeve portion that extends outwardly from the overlapped parts. This portion has a first circular flange which projects radially outwardly and is spaced a certain distance above the top surface of the topmost part. It also has a second circular flange parallel to and spaced above the first. The second flange defines the outwardmost or top surface end of the clamping bolt assembly.

The bolt-gripping means associated with each slider bar includes a channel member having a C-shaped opening shaped for horizontal sliding fitment over the clamping bolt's topmost flange. This latter member is normally positioned underneath each slider bar and has a nut portion, fixedly connected to its top, which has an axially threaded opening. A threaded rod bolt extends through each slider bar and engages with this portion. Tightening the rod bolt while the channel member is engaged with the clamping bolt pulls certain portions of the slider bar tightly against the parts or workpieces, thus firmly clamping it thereto.

The invention as disclosed hereinabove utilizes certain elements which have been previously disclosed and/or patented by Quentin Woods. Specifically, the above-mentioned clamp-up bolt assembly is the subject of a copending application and the drill, which is carried by the above-mentioned carriage, is preferably the gimbaled drill disclosed by Mr. Woods in U.S. Pat. No. 4,613,262. The invention utilizes these elements in combination with still other structural elements to provide a lightweight track drill that can drill fastener holes in aircraft body skins which are normal to the skins, and which have concentric countersinks whose depths are drilled accurately. These features, and others, will become apparent upon considering the remaining description when taken in conjunction with the drawings.

BRIEF DESCRIPTION OF THE DRAWINGS

Referring to the accompanying drawings which are for illustrative purposes:

FIG. 1 is a fragmentary pictorial view of a semi-automatic track drill constructed in accordance with the invention and secured to a seam along an aircraft body;

FIG. 2 is an enlarged fragmentary pictorial view of the seam shown in FIG. 1 after the track drill has drilled fastener holes therein;

FIG. 3 is a pictorial view of a spacing device or spacer for positioning a drill carriage in the track drill vertically with respect to drilling the holes shown in FIG. 2;

FIG. 4 is a pictorial view of a drill template for positioning the track drill's carriage properly to sequentially drill fastener holes;

FIG. 5 is an enlarged fragmentary pictorial view of the template shown in FIG. 4 and of a detent assembly for registering the track drill's carriage when individual lands and grooves of the template;

FIG. 6 is an enlarged fragmentary pictorial view of one slider bar of the track drill shown in FIG. 1;

FIG. 7 is an enlarged side cross-sectional view of a gripping and clamping device which attaches the track drill shown in FIG. 1 to the side of an aircraft;

FIG. 8 is an enlarged cross-sectional view of a clamping bolt assembly which is used to make the connection shown in FIG. 7;

BEST MODE FOR CARRYING OUT THE INVENTION

Figure 9:
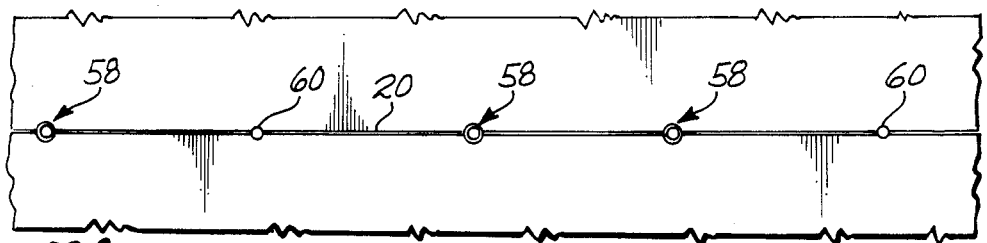
FIG. 9 is a top plan view of a seam in an aircraft body.

Referring now to the drawings, and first to FIG. 1, therein is shown at 10 a track drill assembly constructed in accordance with a preferred embodiment of the invention. The assembly 10 includes first and second elongated rails 12, 14 which extend lengthwise along the body of an aircraft 16. The purpose of the assembly 10 is to drill a series of fastener holes 18 (two rows 18A, 18B) along a seam 20 in the aircraft's body as shown in FIG. 2. At the seam 20, the edges 22, 24 of the sheets which make up the body 16 overlap a second part or stringer 26. The holes 18 are drilled through both the edges 22, 24 and the underlying stringer 26, this type of operation being familiar to the skilled person.

Positioned transversely across rails 12, 14 are a plurality of slider bars 28, 30, 32. Each bar 28, 30, 32 has upper and lower end portions 34, 36 which slidably surround one of the rails 12, 14 and which permit movement of the slider bars 28, 30, 32 along the rails. Each bar end portion is split, with one half 40 being positioned between its respective rail 12 or 14 and the body 16, and the other half 42 being positioned on the opposite side of the rail. The inner half normally presses tightly against the body 16, which will be further described below. Any one of the bars 28, 30, 32 may be temporarily fixed in position by conventional tightening screws 38 which upon tightening cause the bar's split end portions 40, 42 to be drawn together against the rails.

A drill carriage 44 is positioned between two of the bars 28, 30 and may be slidably moved along the rails 12, 14 therebetween. The carriage 44 has upper and lower horizontal sliding blocks 46, 48 which are interconnected by a pair of vertical posts 50, 52. Surrounding posts 50, 52 are vertical sliding blocks 51, 53 which support a drill platform 54, to which a drill 56 is mounted. Preferably, the type of drill used is similar in construction to the gimbaled drill disclosed in U.S. Pat. No. 4,613,262 which issued to Quentin T. Woods on Sept. 23, 1986. Operation of the drill 56 is fully described in this patent and need not be further described here.

The assembly 10 is attached to the body 16 by temporary clamp-up bolts 58, an example of which is best seen in FIGS. 6–8. Each clamp-up bolt has a hollow split end 60 which extends through an opening 62 in overlapping parts 22, 24, 26 (see FIG. 8) and is positioned in seam 20. Preferably, opening 62 will be one of the holes in either row 18A or 18B which is predrilled. The innermost portion 68 of end 60 has shoulders 70 which catch the inside surface 72 of the innermost part 26 after the bolt's end 60 is spread. Spreading is accomplished by a vertical mandrel member 74 which is thrust inwardly in the direction indicated by arrow 76. Surrounding an upper end of the mandrel member 74, and fixedly connected thereto, is a threaded portion 78. This portion 78 is surrounded by a hollow sleeve portion 80 that has inner threads 82 in engagement with the threads of portion 78. This arrangement permits tightening of the sleeve 82 downwardly against the topmost surface 84 of the upper parts 22, 24.

The sleeve 80 has a first circular flange portion 86 which is spaced a certain distance above surface 84 and projects radially outwardly. It further has a second circular flange 88 spaced above the first 86. This second flange defines a circular top surface 90 (see FIG. 6) which normally faces outwardly relative to the aircraft's body 16. The clamp-up bolt assembly may be removed from opening 62 by unscrewing sleeve 80 from portion 78 and pulling mandrel member 74 outwardly in the direction opposite to arrow 76. After removal of the bolt assembly 58 the opening 62 may be filled by an appropriate fastener.

The track drill assembly 10 is attached to the clamp-up bolts 58 by gripping devices or clamping members which are attached to each slider bar 28, 30, 32. Specifically, and referring now to FIG. 6 which shows one of the bars 28, the inner split ends 40 of each bar normally rest on the body 16. The transverse portion 91 of each bar, which extends between the rails 12, 14 is normally spaced a certain distance above the body 16. Positioned immediately below the bar is a clamping member 92, which is preferably in the form of a downwardly opening channel member having a "C" shape. This member 92 is shaped for horizontal sliding fitment over the top flange 88 of each clamp-up bolt 58. Fixedly connected to the upper surface of channel member 92 is an internally threaded extension or nut portion 94 which has transversely extending pins 96, 98 received in complementary recesses 100, 102 in the bottom of bar portion 91. These pins and recesses 96, 98, 100, 102 prevent the channel member 92 from rotating during connection of the slider bar 28 to the clamp-up bolt 58. A threaded rod bolt 104, which has a threaded end 106 extending downwardly through an opening 108 in bar portion 91, engages with threaded portion 94. Turning the thumb wheel portion 110 of rod bolt 104 causes channel member 92 to pull upwardly against the underside of top circular flange 88. This in turn forces the bottom surfaces of bar ends 40 tightly against the aircraft body 16. A circular spring 111 surrounds thumb wheel portion 110 and opposes tightening.

Referring to FIG. 4, an elongated template member 122 extends between slider bars 28, 30. The template 122 has end portions 124, 126 shaped for fitment to the particular clamp-up bolts 58 to which bars 28, 30 are attached. More specifically and referring to FIG. 7, each template end portion 124, 126 is shaped for fitment to each bolt assembly 58 around sleeve 80 but below flange 86 and above surface 84. The template 122 is secured in place at the same time the clamp-up bolt assemblies 58 are secured to body 16. In this manner, the template 122 cannot be removed until at least one clamp-up bolt assembly 58 is first removed.

The template 122 has a plurality of lands 128 and grooves 130 which are best seen in FIG. 5. These define preselected locations for stopping the drill carriage 54. In preferred form, the carriage 54 has a handle grip 132 (see FIG. 1) which houses a trigger 134 connected to a lever 136. Activation of the lever 136 causes upward rotation of a detent member 138 out of any particular groove. This permits the carriage 54 to be slidingly moved in one direction or another along rails 12, 14 until the trigger 134 is released. Typically, the trigger is released when the detent member 138 is positioned over the next sequential groove 130 which registers the drill at the next sequential drilling location.

The lands and grooves 128, 130 function to position the carriage 54 and drill 56 along the rails. Transverse positioning of the drill 56 relative to vertical posts 50, 52 is accomplished by use of a spacer member 140 (see FIG. 3). Preferably, a separate spacer 140 is placed around each post 50, 52, either above or below the drill 56 depending on which one of the rows 18A, 18B it is desired to drill. After positioning the spacers the vertical slider blocks 51, 53 may be fixed in position by any suitable tightening means. The thickness of any spacer member 140 will be preselected depending on the desired position of the fastener holes. Each spacer member is held fixed around any given post by a conventional Allen screw 141 which is tightened either inwardly or outwardly.

Figure 10:
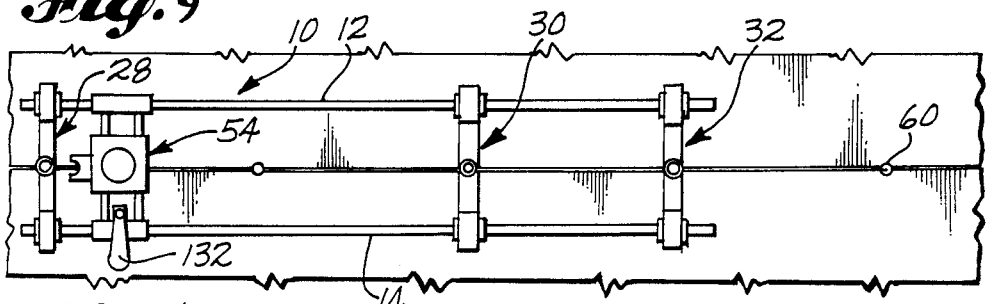
FIG. 10 is a top plan view of the track drill shown in FIG. 1 positioned along the seam shown in FIG. 9.
Figure 11:
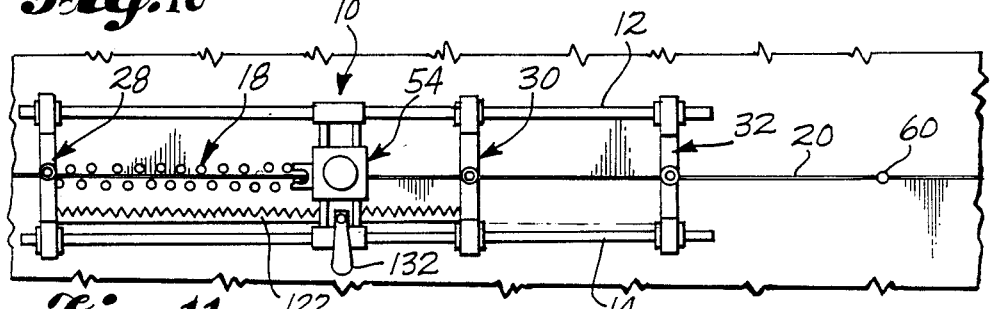
FIG. 11 is a view like FIG. 10, but shows carriage movement of the track drill for drilling a plurality of fastener holes.

Operation of the invention first involves placing a number of clamp-up bolt assemblies 58 along the body seam 20 as is shown in FIG. 9. Then, the slider bars 28, 30, 32 are attached to certain ones of the clamp-up bolts 58, as shown in FIG. 10. This is followed by moving the carriage 54 sequentially from left to right, or right to left, depending on how it is desired to drill the fastener holes 18A, 18B. Probably, the carriage would be moved in one direction for drilling one of rows 18A, 18B, and then the spacers 140 would be changed for drilling the other row.

Figure 12:
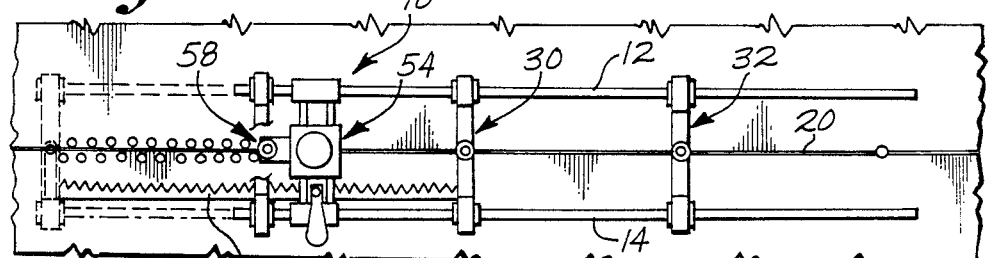
FIG. 12 is a view like FIG. 10 and 11, but shows movement of the track drill's rails for drilling a new sequence of fastener holes.
Figure 13:
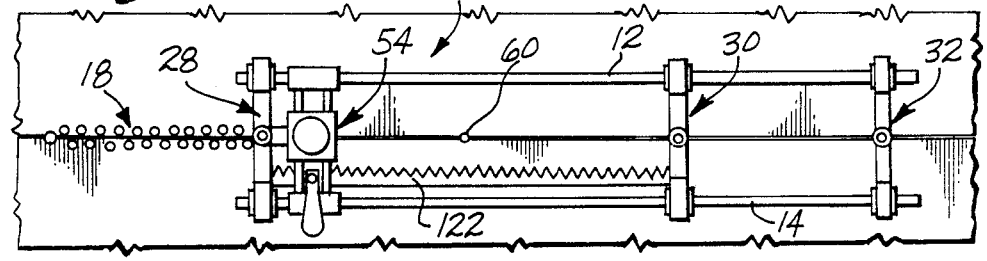
FIG. 13 is a view like FIG. 12 but shows repositioning of the track drill's slider bars.
Figure 14:
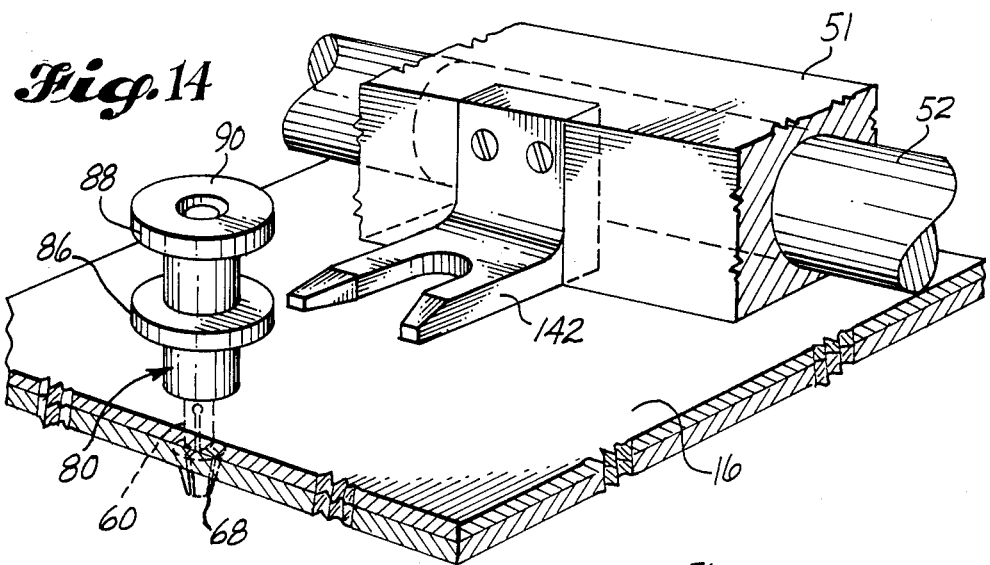
FIG. 14 is an enlarged fragmentary pictorial view of a forked portion of the track drill's carriage, and shows how such portion is connected to a clamping bolt assembly.
Figure 15:
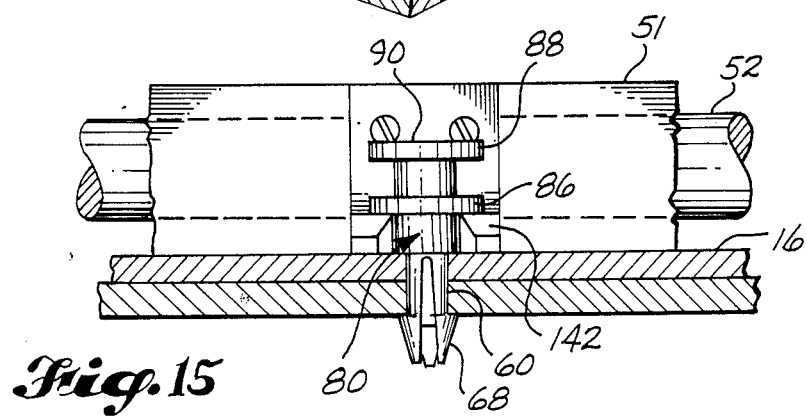
FIG. 15 is an end view of the forked portion and clamping bolt assembly shown in FIG. 14.

After the holes have been drilled between bars 28, 30, a new clamp-up bolt 58 is installed adjacent the carriage 54 as shown in FIG. 12. The carriage 54 has a fork 142 (see FIGS. 14 and 15) which fits below the lower flange of the new bolt 86. Clamp-up pressure applied by the drill 56, which was fully described in U.S. Pat. No. 4,613,362, causes fork 142 to exert upward pressure against carriage bolt flange 86, thus holding the carriage fixed. At this point, slider bar 28 is released from the left-handmost clamp-up bolt 58 by unscrewing its respective rod bolt 104; the end portions 34, 36 of each slider bar are loosened, and the left-hand bar 28 and rails 12, 14 are slid to the right until the left-hand bar's clamping member 92 slides over the top flange of the new clamp-up bolt 58. At this point, bar 28 is then secured at the new location. Bars 30, 32 are then moved one at a time to new clamp-up positions along rails 12, 14 as shown in FIGS. 12 and 13. The particular clamp-up bolt 58 to which slider bar 30 was attached would be temporarily removed to permit complete carriage movement between the new positions of bars 28, 30.

As shown in FIGS. 12 and 13, the template 122 would also be moved along with the slider bars 28, 30, 32. If desired, more than one template 122 could be extended along rails 12, 14 by appropriate positioning of carriage bolts 58.

The present invention eliminates notches made on the workpieces by hand-held drills, permits the drills to be positioned normally to the workpieces, and eliminates eccentricity problems with respect to drilling fastener holes. The grooves 130 on the template 122, spaced between the lands 128 are generally V-shaped so as to be self-centering for the detent 138 that fits therein, and this eliminates wear on the detent and on the groove surfaces. The elimination of eccentricity positioning of the drills and requiring the drills to be normal to the workpieces substantially further reduces wear on the drill bits used by the invention.

Having thus described a preferred embodiment for carrying out the invention, it is to be appreciated the above description is not to be taken in a limiting sense. The scope and content of the invention is to be limited only by the subjoined claims, wherein such claims are to be interpreted in accordance with established doctrines of patent claim interpretation.

What is claimed is:

1. A semi-automatic track drill for use in drilling fastener holes in overlapped parts on an aircraft body, comprising:
   a pair of generally parallel spaced rails;
   a plurality of at least two slider bars positioned transversely between said rails, each bar having opposite ends slidably connected to, respectively, one of said rails;
   gripping means, connected to each slider bar, for fixedly attaching said bar to a clamping bolt, wherein said clamping bolt is temporarily secured to the parts to be drilled, one clamping bolt each being secured to said part adjacent each respective slider bar, said bolts normally being spaced apart from each other a certain distance along said aircraft body;
   a drill carriage slidably engaged with said rails and normally positioned between said at least two slider bars, said carriage having a drill fixedly connected thereto; and
   a drill guide template securable to a pair of said clamping bolts and extending therebetween, said template having a plurality of sequential lands and grooves, wherein said drill carriage includes means for releasably registering said drill with any one of said grooves, for positioning said drill at certain desired locations along said aircraft body.

2. The track drill of claim 1, wherein each clamping bolt includes a sleeve portion that projects outwardly from said body, said sleeve portion having a first circular flange projecting radially outwardly from said sleeve portion, said first flange being spaced a certain distance above the topmost surface of said parts, and further having a second circular flange spaced above the first, said second flange defining a circular outwardly facing surface, and said gripping means further including
   a clamping member having a downwardly opening channel defining an opening shaped for horizontal sliding fitment over said second flange of said clamping bolt, and a rod bolt extending through said slider bar and in threaded engagement with said clamping member in a manner so that tightening said rod bolt pulls said slider bar toward said clamping bolt.

3. The track drill of claim 1, wherein said means for releasably registering said drill includes a detent member pivotally connected to said drill carriage for engagement with said grooves of said template, and hand-operated means for pivoting said detent member out of any one of said grooves, to permit sliding movement of said carriage relative to said rails.

4. The track drill of claim 3, wherein said hand-operated means includes a handle grip attached to said carriage, said handle grip having a trigger pivotally connected thereto, and a lever member received within said handle grip, said lever member drivingly linking pivotal movement of said trigger to pivotal movement of said detent member.

5. The track drill of claim 4, wherein said grooves are "V"-shaped, and said detent member is shaped for sliding fitment thereinto.

* * * * *